(12) United States Patent
Watanabe et al.

(10) Patent No.: US 10,906,996 B2
(45) Date of Patent: Feb. 2, 2021

(54) POLYMERIZATION CATALYST, COPOLYMER, POLYMER COMPOSITION, AND CROSSLINKED POLYMER

(71) Applicant: JSR CORPORATION, Minato-ku (JP)

(72) Inventors: Ayumi Watanabe, Minato-ku (JP); Shoichi Matsumoto, Minato-ku (JP); Takuo Sone, Minato-ku (JP)

(73) Assignee: JSR CORPORATION, Minato-ku (JP)

( * ) Notice: Subject to any disclaimer, the term of this patent is extended or adjusted under 35 U.S.C. 154(b) by 0 days.

(21) Appl. No.: 16/080,152

(22) PCT Filed: Mar. 1, 2017

(86) PCT No.: PCT/JP2017/008204
§ 371 (c)(1),
(2) Date: Aug. 27, 2018

(87) PCT Pub. No.: WO2017/154710
PCT Pub. Date: Sep. 14, 2017

(65) Prior Publication Data
US 2019/0048107 A1    Feb. 14, 2019

(30) Foreign Application Priority Data
Mar. 11, 2016    (JP) ................... 2016-048904

(51) Int. Cl.
*C08F 4/68*    (2006.01)
*C08F 236/04*    (2006.01)
(Continued)

(52) U.S. Cl.
CPC ............. *C08F 4/68* (2013.01); *B01J 31/0241* (2013.01); *B01J 31/143* (2013.01); *C08F 4/62* (2013.01);
(Continued)

(58) Field of Classification Search
CPC ........ C08F 4/68; C08F 236/04; C08F 210/00; B01J 31/02; B01J 31/14
See application file for complete search history.

(56) References Cited

U.S. PATENT DOCUMENTS

| 3,898,207 A | 8/1975 | Halasa et al. |
| 3,940,378 A | 2/1976 | Furukawa et al. |
| 4,575,574 A * | 3/1986 | Kresge |

FOREIGN PATENT DOCUMENTS

| CN | 1850870 A | 10/2006 |
| CN | 101575393 A | 11/2009 |

(Continued)

OTHER PUBLICATIONS

Machine translation of Liu et al. (CN 101575393). (Original provided by applicant.) (Year: 2009).*

(Continued)

*Primary Examiner* — Catherine S Branch
(74) *Attorney, Agent, or Firm* — Oblon, McClelland, Maier & Neustadt, L.L.P.

(57) ABSTRACT

Provided is a polymerization catalyst including a metal complex obtained by mixing at least one ketimine derivative selected from the group consisting of a β-ketimine compound and a tautomer thereof with a compound having at least one metal selected from among Group 4 and 5 transitional metals, an organoaluminum compound, and a halogen compound.

3 Claims, 1 Drawing Sheet

(51) Int. Cl.
C08F 210/00 (2006.01)
B01J 31/02 (2006.01)
B01J 31/14 (2006.01)
C08F 4/62 (2006.01)
C08F 236/06 (2006.01)

(52) U.S. Cl.
CPC .......... *C08F 210/00* (2013.01); *C08F 236/04* (2013.01); *C08F 236/06* (2013.01); *B01J 2531/56* (2013.01); *B01J 2540/20* (2013.01)

(56) References Cited

FOREIGN PATENT DOCUMENTS

| | | | |
|---|---|---|---|
| EP | 0 039 805 A1 | 11/1981 | |
| GB | 1 327 664 A | 8/1973 | |
| JP | 57-3807 A | 1/1982 | |
| JP | S61-143496 A | 7/1986 | |
| JP | 2004-277721 A | 10/2004 | |
| JP | 2012-31317 A | 2/2012 | |
| JP | 2012-162629 A | 8/2012 | |
| JP | 2013-035943 A | 2/2013 | |

OTHER PUBLICATIONS

International Search Report and Written Opinion dated Apr. 25, 2017 in PCT/JP2017/008204 (English translation of the Search Report only was previously filed), 7 pages.
Korean Office Action dated Jun. 7, 2019 in Patent Application No. 10-2018-7019143, 7 pages (with unedited computer generated English translation).
International Search Report dated Apr. 25, 2017 in PCT/JP2017/008204 filed Mar. 1, 2017.
Extended European Search Report dated Mar. 1, 2019 in the corresponding European Application No. 17763050.6 8 pages.
Tang, Li-Ming, et al., "Ethylene polymerizations, and the copolymerizations of ethylene with Hexene or Norbornene with Highly Active Mono ([beta]-enaminoketonato) vanadium(III) Catalysts", Journal of Polymer Science, Part A: Polymer Chemistry, vol. 46, No. 6, XP055558209, Mar. 15, 2008, pp. 2038-2048.
Barbier-Baudry, D., et al., "Organolanthanides, catalysts for specific olefin-diene copolymerization: access to new materials", Journal of Alloys and Compounds., vol. 323-324, XP055559220, 2001, pp. 592-596.
Furukawa, J., et al., "Random Copolymer of Butadiene and Propylene Prepared with $TiCl_4$—$Et_3Al$-Phosgene Catalyst", Journal of Polymer Science: Polymer Chemistry; vol. 11, XP055559919, 1973, pp. 629-636.
International Preliminary Report on Patentability and Written Opinion dated Sep. 11, 2018 in PCT/JP2017/008204 (submitting English translation only), 6 pages.
Korean Office Action dated Jan. 25, 2019 in Patent Application No. 10-2018-7019143 (with English translation), 14 pages.
Peter Cass, et al., "Investigation of Methylaluminoxane as a Cocatalyst for the Polymerization of 1,3-Butadiene to High cis-1,4-Polybutadiene" Journal of Polymer Science: Part A: Polymer Chemistry, vol. 37, Jan. 21, 2000, pp. 3277-3284.
Office Action as received in the corresponding Korean divisional patent application No. KR10-2019-7007779, dated Sep. 19, 2019, 7 pages, w/Computer generated English translation.
Office Action as received in the Korean divisional patent application No. KR10-2019-7007779, dated Feb. 20, 2020, 7 pages, w/Computer generated English translation.
Communication pursuant to Article 94(3) EPC dated Dec. 18, 2019 in corresponding European Patent Application No. 17 763 050.6, 4 pages.
Office Action as received in the corresponding Chinese Patent Application No. 201780006335.6 dated Mar. 5, 2020 w/English Translation.
Office Action as received in the corresponding JP Patent Application No. 2018-504415 dated May 18, 2020 w/English Translation.
Office Action as received in the corresponding JP Patent Application No. 2018-504415 dated Jun. 2, 2020 w/English Translation.
Office Action dated Jul. 27, 2020 in corresponding Chinese Patent Application No. 201780006335.6 (with English Translation), 8 pages.

* cited by examiner

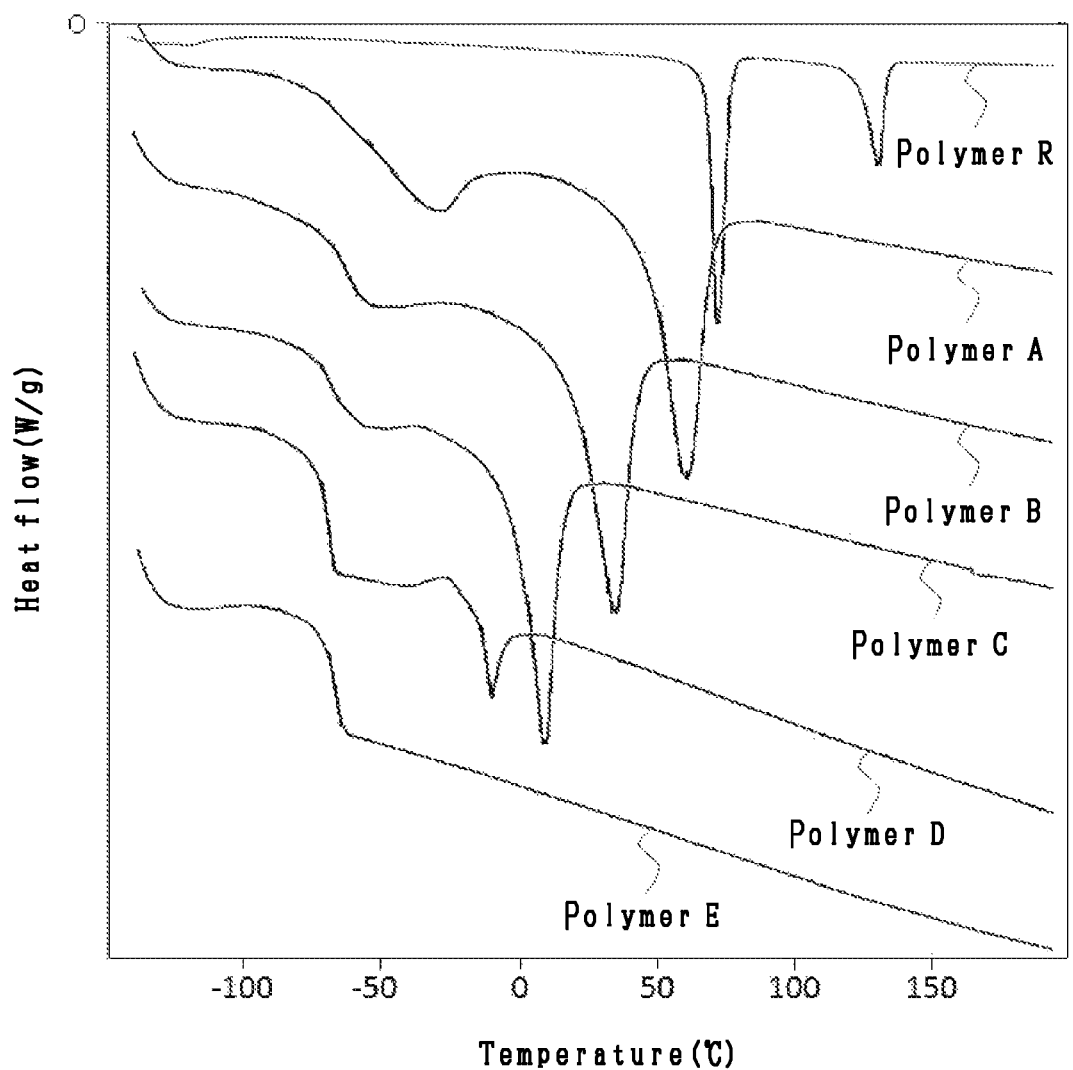

POLYMERIZATION CATALYST, COPOLYMER, POLYMER COMPOSITION, AND CROSSLINKED POLYMER

TECHNICAL FIELD

The present disclosure relates to a polymerization catalyst, a copolymer, a polymer composition, and a crosslinked polymer. More particularly, the present disclosure relates to, for example, a polymerization catalyst suitable for production of a copolymer of a conjugated diene compound and an α-olefin.

BACKGROUND ART

Various methods have conventionally been proposed for producing a copolymer of a conjugated diene compound and an olefin. For example, Patent Document 1 discloses the production of a butadiene-propylene alternating copolymer through polymerization between butadiene and propylene in the presence of an organometallic catalyst composed of an oxovanadium compound and trialkylaluminum. Patent Document 2 discloses a copolymer of a conjugated diene compound and an acyclic non-conjugated olefin, wherein the copolymer has a weight average molecular weight of more than 25,000 in terms of polystyrene and a non-conjugated olefin content falling within a specific range, and the conjugated diene compound moiety has a cis-1,4-bond content of 50% or more. Patent Document 2 describes that the copolymer is produced through polymerization by using, as a polymerization catalyst, a polymerization catalyst composition containing a metallocene complex, a polymerization catalyst composition containing a rare earth compound, or a polymerization catalyst composition containing a metallocene composite catalyst.

RELATED ART

Patent Documents

Patent Document 1: Japanese Patent Application Laid-Open (kokai) No. S57-3807
Patent Document 2: Japanese Patent Application Laid-Open (kokai) No. 2012-031317

SUMMARY OF THE INVENTION

Problems to be Solved by the Invention

For example, as described in Patent Document 1, the conventional method produces a polymer of high molecular weight through copolymerization between a conjugated diene compound and an α-olefin only at an ultralow temperature of −50° C. or −30° C., and produces only a polymer of low molecular weight (e.g., a polymer having a number average molecular weight of less than 10,000) at a polymerization temperature of 0° C. In the case of the use of the conventional polymerization catalyst composed of an oxovanadium compound and trialkylaluminum, only an alternating copolymer of a conjugated diene compound and an α-olefin can be produced, and the compositional ratio of the monomers cannot be changed. Although the polymerization catalyst disclosed in Patent Document 2 can be used for copolymerization between butadiene and ethylene, the polymerization catalyst has not been used for polymerization of an α-olefin, such as propylene. Thus, demand has arisen for a polymerization catalyst useful for production of a copolymer of a conjugated diene compound and an α-olefin.

In view of the foregoing, an object of the present disclosure is to provide a polymerization catalyst that enables copolymerization between a conjugated diene compound and an α-olefin under mild temperature conditions. Another object of the present disclosure is to provide a conjugated diene compound-α-olefin copolymer produced by use of the polymerization catalyst.

Means for Solving the Problems

The present disclosure provides a polymerization catalyst, a copolymer and a production method therefor, a method for producing a polymerization catalyst, a polymer composition, and a crosslinked polymer, which are described below.

[1] A polymerization catalyst comprising:
a metal complex obtained by mixing at least one ketimine derivative selected from the group consisting of a β-ketimine compound and a tautomer thereof with a compound having at least one metal selected from among Group 4 and 5 transitional metals;
an organoaluminum compound; and
a halogen compound.

[2] A method for producing a copolymer, the method comprising polymerization between a conjugated diene compound and a C3 to C8 α-olefin in the presence of the polymerization catalyst described in [1] above.

[3] A method for producing a polymerization catalyst, the method comprising:
mixing at least one ketimine derivative selected from the group consisting of a β-ketimine compound and a tautomer thereof, a compound having at least one metal selected from among Group 4 and 5 transitional metals, an organoaluminum compound, and a halogen compound.

[4] A copolymer comprising a structural unit MA derived from a conjugated diene compound and a structural unit MB derived from a C3 to C8 α-olefin, the copolymer having a melting point falling within a range of −15° C. to 140° C. and a number average molecular weight of 10,000 or more as measured by gel permeation chromatography, wherein the ratio by mole of the structural unit MA to the structural unit MB (MA/MB) is 55/45 to 99/1.

[5] A polymer composition, comprising the copolymer produced by the method described in [2] above, or the copolymer described in [4] above, and a crosslinking agent.

[6] A crosslinked polymer obtained by crosslinking the polymer composition described in [5] above.

Effects of the Invention

The use of the polymerization catalyst of the present disclosure can produce a conjugated diene compound-α-olefin copolymer having a number average molecular weight Mn of 10,000 or more under mild temperature conditions, and thus the polymerization catalyst is industrially advantageous. Also, the use of the polymerization catalyst can produce a novel copolymer in which the ratio of a structural unit derived from a conjugated diene compound is higher than that of a structural unit derived from an α-olefin, and the ratio of the structural units can be varied to desired values.

BRIEF DESCRIPTION OF DRAWINGS

FIG. 1 A graph showing DSC curves of (co)polymers of Examples and Referential Examples.

EMBODIMENTS FOR CARRYING OUT THE INVENTION

Next will be described the polymerization catalyst, copolymer, polymer composition, and crosslinked polymer of the present disclosure, as well as the production method of the present disclosure.

<Polymerization Catalyst>

The polymerization catalyst of the present disclosure contains, as a catalyst component, a metal complex obtained by mixing at least one ketimine derivative selected from the group consisting of β-ketimine compounds and tautomers thereof with a compound having at least one metal selected from among Group 4 and 5 transitional metals (hereinafter the compound may be referred to simply as "transition metal compound"). As used herein, the term "polymerization catalyst" includes a single-component catalyst containing a catalytic component alone, and a multicomponent catalyst containing a catalytic component in combination with a promoter (i.e., a composite catalyst).

No particular limitation is imposed on the aforementioned ketimine derivative, so long as it is a β-ketimine compound or a tautomer thereof. As used herein, the "tautomer of a β-ketimine compound" includes enols and enamines. Specific examples of preferred β-ketimine compounds include compounds represented by the following formula (1):

[F1]

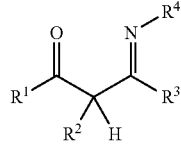

(1)

(wherein $R^1$ to $R^4$ each represent a hydrocarbyl group which may be substituted by a halogen atom).

In the aforementioned formula (1), each of $R^1$ to $R^4$ is preferably a C1 to C20 branched or linear alkyl group which may be substituted by a halogen atom, a C3 to C20 cycloalkyl group which may be substituted by a halogen atom, or a C6 to C20 aryl group which may be substituted by a halogen atom. When any of $R^1$ to $R^4$ is an alkyl group, the alkyl group, which may be a linear or branched alkyl group, is, for example, a methyl group, an ethyl group, a propyl group, a butyl group, a pentyl group, a hexyl group, a heptyl group, or an octyl group. When any of $R^1$ to $R^4$ is a halogenated alkyl group, the halogenated alkyl group is, for example, a group prepared through substitution of at least one hydrogen atom of any of the above-exemplified alkyl groups by a fluorine atom or a chlorine atom. When any of $R^1$ to $R^4$ is an alkyl group, the number of carbon atoms of the alkyl group is preferably 1 to 10, more preferably 1 to 3. Among $R^1$ to $R^4$, each of $R^1$ and $R^3$ is preferably a C1 to C8 alkyl group, more preferably a C1 to C3 alkyl group. $R^2$ is preferably a C1 to C5 alkyl group, more preferably a methyl or ethyl group.

$R^4$ is preferably a C1 to C20 linear or branched alkyl group, a C3 to C20 cycloalkyl group, a C6 to C20 aryl group, or a group prepared through substitution of at least one hydrogen atom of any of the above-exemplified groups by a fluorine atom or a chlorine atom. In view of polymerization under mild temperature conditions, $R^4$ is preferably a C4 to C20 branched alkyl group, a C3 to C20 cycloalkyl group, or a C6 to C20 aryl group, particularly preferably a phenyl group. The ketimine derivatives may be used singly or in combination of two or more species.

No particular limitation is imposed on the transition metal compound, so long as it contains at least one species selected from among Group 4 and 5 transition metals. Examples of the transition metal compound include titanium tetrachloride, titanium trichloride, titanium tetraethoxide, titanium tetraisopropoxide, titanium n-butoxide, zirconium tetrachloride, zirconium trichloride, zirconium ethoxide, zirconium isopropoxide, zirconium n-butoxide, hafnium chloride, hafnium ethoxide, hafnium t-butoxide, vanadium trichloride, vanadium oxytrichloride, vanadium oxytrimethoxide, vanadium oxytriethoxide, vanadium oxytriisopropoxide, vanadium oxytributoxide, vanadium oxytriisobutoxide, niobium ethoxide, niobium niobium isopropoxide, tantalum methoxide, and tantalum ethoxide. Of these, preferred are compounds containing Group 5 transition metals, and particularly preferred are oxovanadium compounds. The transition metal compounds may be used singly or in combination of two or more species.

The metal complex can be prepared by a method generally used for synthesis of a metal complex of a β-ketimine compound. For example, the metal complex can be synthesized through reaction between a ketimine derivative and the transition metal compound in an appropriate organic solvent (e.g., toluene). No particular limitation is imposed on the amounts the ketimine derivative and transition metal compound used for the reaction. For example, the transition metal compound is used in an amount of 0.1 to 1.0 mol, preferably 0.2 to 0.7 mol, relative to 1 mol of the ketimine derivative. The reaction temperature and the reaction time can be appropriately determined; for example, the reaction temperature is adjusted to 0 to 100° C., and the reaction time is adjusted to several hours to several tends of hours. The resultant reaction mixture may be subjected to polymerization without any treatment. Alternatively, the metal complex may be separated from the reaction mixture, and then the reaction mixture may be subjected to optional purification, followed by polymerization of the reaction mixture.

The polymerization catalyst of the present disclosure is a multicomponent catalyst containing the metal complex and promoters (i.e., a halogen compound and an organoaluminum compound). Thus, the metal complex can exhibit a sufficient catalytic performance. The polymerization catalyst of the present disclosure may contain components other than the metal complex, the halogen compound and the organoaluminum compound (e.g., promoters other than the halogen compound and the organoaluminum compound), so long as the advantageous effects of the present disclosure are not impaired.

The halogen compound is preferably a chlorine-containing compound, more preferably a compound having a structure in which chlorine is bonded to tertiary carbon or tertiary silicon. As used herein, the term "tertiary carbon" refers to a carbon atom to which three hydrocarbon groups are bonded, and the term "tertiary silicon" refers to a silicon atom to which three hydrocarbon groups are bonded. All the three hydrocarbon groups bonded to the carbon atom or the silicon atom may be monovalent hydrocarbon groups. Alternatively, two of the three hydrocarbon groups bonded to the carbon atom or the silicon atom may be bonded together to form a cyclic structure including the carbon atom or the silicon atom. The halogen compound is particularly preferably a chlorine-containing compound represented by the following formula (2):

$$(R^6)_3-Y^1-Cl \quad (2)$$

(wherein $Y^1$ represents a carbon atom or a silicon atom; each of the radicals $R^6$ represents a hydrocarbyl group; and two radicals $R^6$ may be bonded together to form a C3 to C20 ring including the carbon atom to which the radicals $R^6$ are bonded).

The hydrocarbyl group represented by $R^6$ to $R^8$ is, for example, any of the groups exemplified in $R^4$ of the formula (1). The hydrocarbyl group is preferably a C1 to C10 linear or branched alkyl group. Specific examples of the halogen compound include compounds having a partial structure in which chlorine is bonded to tertiary carbon, such as 2-chloro-2-methylpropane, 2-chloro-2-methylbutane, 2-chloro-2,3-dimethylbutane, 2-chloro-2-methylpentane, 2-chloro-2,3,3-trimethylpentane, 3-chloro-3-methylpentane, 2-chloro-2-methylhexane, 2-chloro-2,4-dimethylhexane, 3-chloro-3-methylhexane, 2-chloro-2-methylheptane, 2-chloro-2-methyloctane, 1-chloro-1-methylcyclohexane, 1-chloro-1,2-dimethylcyclohexane, 2-chloro-2-phenylpropane, and trityl chloride; and compounds having a partial structure in which chlorine is bonded to trisubstituted silicon, such as chlorotrimethylsilane, chloroethyldimethylsilane, and chlorotriethylsilane.

The halogen compound is used in an amount of preferably 1 to 50 mol, more preferably 5 to 25 mol, relative to 1 mol of the metal atom of the metal complex. The halogen compounds may be used singly or in combination of two or more species.

No particular limitation is imposed on the organoaluminum compound, so long as it functions as a promoter. The organoaluminum compound is preferably an aluminoxane compound. Specific examples of the aluminoxane compound include methylaluminoxane (MAO), ethylaluminoxane, n-propylaluminoxane, n-butylaluminoxane, isobutylaluminoxane, tert-butylaluminoxane, hexylaluminoxane, isohexylaluminoxane, polymethylaluminoxane (PMAO), modified methylaluminoxane (MAO), and cyclic aluminoxane.

The organoaluminum compound is incorporated in an amount of preferably 10 to 1,000 mol, more preferably 75 to 250 mol, relative to 1 mol of the metal atom of the metal complex. The organoaluminum compounds may be used singly or in combination of two or more species.

The polymerization catalyst of the present disclosure can be produced by a method including a step of mixing the ketimine derivative, the transition metal compound, the organoaluminum compound, and the halogen compound. The halogen compound and the organoaluminum compound may be preliminarily mixed with the ketimine derivative and the transition metal compound to thereby prepare a mixture (i.e., polymerization catalyst), and the mixture may be added into a polymerization system. Alternatively, the ketimine derivative and the transition metal compound may be preliminarily mixed together to prepare a metal catalyst, and then the metal catalyst and the promoter may be added into a polymerization system, to thereby prepare a polymerization catalyst. The latter process is preferred. The ketimine derivative and the transition metal compound are mixed under the conditions as described above for the preparation of the metal complex.

<Copolymer and Production Method Therefor>

The production method for the copolymer of the present disclosure includes a step of polymerizing a conjugated diene compound and a C3 to C8 α-olefin in the presence of the polymerization catalyst of the present disclosure described above.

[Conjugated Diene Compound]

Examples of the conjugated diene compound used in the polymerization include 1,3-butadiene, isoprene, 2,3-dimethyl-1,3-butadiene, 1,3-pentadiene, 1,3-hexadiene, 1,3-heptadiene, 2-phenyl-1,3-butadiene, 3-methyl-1,3-pentadiene, 2-chloro-1,3-butadiene. Of these, 1,3-butadiene, isoprene, and 2,3-dimethyl-1,3-butadiene are preferred, and 1,3-butadiene is more preferred. Incidentally, the conjugated diene compound used in the polymerization has may be one kind or two or more kinds.

The α-olefin used in the polymerization is not particularly limited as long as it is an alkene having 3 to 8 carbon atoms and having a carbon-carbon double bond at the α-position. Examples of the α-olefin used in the polymerization include propylene, 1-butene, 1-pentene, 1-hexene, 1-heptene, 1-octene. Of these, propylene and 1-butene are preferred, and propylene is more preferred. Incidentally, the α-olefin used in the polymerization has may be one kind or two or more kinds.

The amounts of the conjugated diene compound and α-olefin used for the polymerization are preferably regulated such that the ratio by mole of the conjugated diene compound to the α-olefin (i.e., conjugated diene compound/α-olefin) is 5/95 to 99/1. In order to produce a conjugated diene compound-α-olefin copolymer having a melting point, the ratio of the conjugated diene compound to the α-olefin is more preferably adjusted to 20/80 to 99/1. In view of processability, the ratio of the conjugated diene compound to the α-olefin is much more preferably 30/70 to 90/10.

The polymerization may involve the use of an additional monomer other than the conjugated diene compound and the α-olefin. Examples of the additional monomer include ethylene; aromatic vinyl compounds, such as styrene and methylstyrene; (meth)acrylic compounds, such as acrylonitrile, methyl (meth)acrylate, and ethyl (meth)acrylate; and cyclic olefin compounds, such as dicyclopentadiene. The amount of the additional monomer used is appropriately determined depending on the intended use of the polymer. For example, the amount of the additional monomer is preferably 10 mass % or less, more preferably 5 mass % or less, much more preferably 1 mass % or less, relative to the total amount of the monomers.

The polymerization method may be any of a solution polymerization method, a vapor phase polymerization method, and a bulk polymerization method, but the solution polymerization method is preferred. As a polymerization mode, either batch one or continuous one may be used. In the case of solution polymerization, examples of the organic solvent used for polymerization include hydrocarbon solvents such as toluene, xylene, cyclohexane, and methylcyclohexane, and of these, it is preferred to use toluene. Incidentally, as the organic solvent, one kind of the above ones may be used singly or two or more kinds thereof may be used in combination. From the viewpoint of maintaining the balance between productivity and easiness of controlling the polymerization, the amount of the organic solvent used is preferably 200 to 3,000 parts by mass based on 100 parts by mass of the total of the monomers used in the polymerization.

The amount of the polymerization catalyst used for the polymerization is preferably 0.01 to 10 mass %, more preferably 0.1 to 5 mass %, relative to the total amount of the monomers used for the polymerization. The polymerization temperature is −100° C. to 50° C., preferably −80° C. to 50°

C., more preferably −50° C. to 50° C. In particular, the polymerization in the presence of the polymerization catalyst of the present disclosure is preferred, since a conjugated diene compound-α-olefin copolymer having a number average molecular weight Mn of 10,000 or more can be produced at a polymerization temperature of −20° C. to 40° C. or even at a polymerization temperature of −10° C. to 20° C. The number average molecular weight Mn corresponds to that in terms of polystyrene as measured by gel permeation chromatography (GPC). The polymerization reaction is preferably performed at a pressure sufficient for maintaining the monomers substantially in a liquid phase. Such a pressure can be achieved by, for example, pressurizing the interior of the reactor by use of a gas inert to the polymerization reaction.

The above-described polymerization reaction can produce a conjugated diene compound-α-olefin copolymer including a structural unit derived from a conjugated diene compound and a structural unit derived from a C3 to C8 α-olefin. The weight average molecular weight Mw (in terms of polystyrene) of the resultant conjugated diene compound-α-olefin copolymer as measured by GPC is preferably $1.5 \times 10^3$ to $1.5 \times 10^6$, more preferably $1.0 \times 10^4$ to $1.0 \times 10^6$, from the viewpoints of mechanical strength and processability. The number average molecular weight Mn of the copolymer is preferably $1.5 \times 10^3$ to $1.5 \times 10^6$, more preferably $2.0 \times 10^3$ to $1.0 \times 10^6$, still more preferably $5.0 \times 10^3$ to $5.0 \times 10^5$, particularly preferably $1.0 \times 10^4$ to $1.0 \times 10^5$. The ratio of the weight average molecular weight Mw to the number average molecular weight Mn; i.e., the molecular weight distribution (Mw/Mn), is preferably 5.0 or less, more preferably 3.0 or less.

The polymerization in the presence of the polymerization catalyst can produce a conjugated diene compound-α-olefin copolymer having a melting point falling within a range of −15° C. to 140° C. through regulation of the ratio of a structural unit MA derived from the conjugated diene compound and a structural unit MB derived from the α-olefin. A very low melting point of the copolymer may cause low crystallinity of the copolymer, resulting in low mechanical strength of a crosslinked polymer produced through crosslinking of the copolymer. In contrast, a very high melting point of the copolymer may cause low rubber elasticity of the resultant crosslinked polymer at ambient temperature. From these viewpoints, the conjugated diene compound-α-olefin copolymer has a melting point of preferably −10° C. to 140° C., more preferably 0 to 100° C. The melting point of the copolymer corresponds to a temperature at which the amount of heat absorption caused by crystal melting peaks in a melting curve prepared by means of a differential scanning calorimeter (DSC).

In the conjugated diene compound-α-olefin copolymer produced through the polymerization, the melting point can be regulated by varying the ratio of a structural unit MA derived from the conjugated diene compound and a structural unit MB derived from the α-olefin included in the copolymer. The copolymer is preferred in view of high degree of freedom of design. In the copolymer, the ratio of the structural unit MA derived from the conjugated diene compound is preferably higher than that of the structural unit MB derived from the α-olefin. Specifically, the ratio by mole of the structural unit MA derived from the conjugated diene compound to the structural unit MB derived from the α-olefin (i.e., MA/MB) is preferably 51/49 to 99/1, more preferably 55/45 to 99/1, still more preferably 55/45 to 95/5, particularly preferably 60/40 to 90/10. The polymerization of monomers containing a conjugated diene compound and an α-olefin in the presence of the polymerization catalyst of the present disclosure produces a conjugated diene compound-α-olefin random copolymer.

In the conjugated diene compound-α-olefin copolymer produced through the aforementioned polymerization, when the conjugated diene compound is butadiene, the entire structural unit derived from butadiene has a trans-1,4-bond content of preferably more than 50% for achieving a desired melting point. The trans-1,4-bond content is more preferably 60% or more, still more preferably 80% or more, particularly preferably 90% or more. The trans-1,4 bond content can be measured by means of, for example, FT-IR or $^{13}$C-NMR.

The copolymer production method of the present disclosure can produce a conjugated diene compound-α-olefin copolymer having a malting point falling within a range of −15° C. to 140° C. and a number average molecular weight Mn of 10,000 or more in terms of polystyrene as measured by GPC, wherein the ratio by mole of a structural unit MA derived from the conjugated diene compound to a structural unit MB derived from the α-olefin (i.e., MA/MB) is 55/45 to 99/1. The conjugated diene compound-α-olefin copolymer can be produced under mild temperature conditions in the presence of the polymerization catalyst of the present disclosure, and thus the copolymer is industrially advantageous. Since the melting point of the copolymer can be regulated by varying the compositional ratio of the monomers, the copolymer has high degree of freedom of design and can be used for a variety of applications. The preferred ranges of the melting point, the number average molecular weight Mn, and the ratio by mole (MA/MB) are as described above.

<Polymer Composition and Crosslinked Polymer>
(Polymer Component)

The polymer composition of the present disclosure contains the aforementioned conjugated diene compound-α-olefin copolymer of the present disclosure as a polymer component. The amount of the copolymer contained is preferably 20 mass % or more, more preferably 30 mass % or more, still more preferably 40 mass % or more, relative to the total amount of the polymer composition. An upper limit of the amount of the copolymer contained in the polymer composition is, for example, 99 mass % or less, relative to the total amount of the polymer composition.

The polymer composition may contain a polymer other than the copolymer (i.e., an additional polymer). Examples of the additional polymer include known polymers such as natural rubber, synthetic isoprene rubber, butadiene rubber, styrene-butadiene rubbers, ethylene-α-olefin copolymer rubber, acrylonitrile-butadiene copolymer rubber, chloroprene rubber, halogenated butyl rubber, styrene-isoprene copolymer rubber, and butadiene-isoprene copolymer rubber, and mixtures thereof. The amount of the additional polymer is preferably 30 mass % or less, more preferably 20 mass % or less, still more preferably 10 mass % by or less, relative to the total amount of the polymer components contained in the polymer composition.

(Crosslinking Agent)

The polymer composition contains a crosslinking agent (vulcanizing agent). Examples of the crosslinking agent include sulfur, sulfur halides, organic peroxides, quinone dioximes, organic polyvalent amine compounds, alkylphenol resins having a methylol group. As the crosslinking agent, sulfur is usually used. The amount of sulfur is preferably 0.1 to 5 parts by mass, more preferably 0.5 to 3 parts by mass, relative to 100 parts by mass of the total amount of the polymer components contained in the polymer composition.

The polymer composition may contain various additives and the like that are commonly used in the rubber industry in a range where the effects of the present disclosure are not impaired, in addition to the components described above. Examples of such additives include antiaging agents, zinc white, stearic acid, extender oils, softeners, sulfur, vulcanization accelerators, antioxidants, ultraviolet absorbents, coloring agents, pigments, light stabilizers, thermal polymerization inhibitors, antifoaming agents, leveling agents, antistatic agents, surfactants, storage stabilizers, flame retardants, fillers. The amount thereof may be appropriately determined, so long as the advantageous effects of the present disclosure are not impaired.

The polymer composition can be produced by kneading the polymer component(s) and a crosslinking agent and also component(s) to be blended as needed using a kneader such as an open type kneader (e.g., a roll) or a closed type kneader (e.g., Banbury mixer). The polymer composition is applicable to various rubber molded products as crosslinked polymers by crosslinking (vulcanization) after molding. Specifically, it can be used as seals such as packing, gaskets, weather strips, and O-rings; interior and exterior surface materials for a variety of vehicles such as automobiles, ships, aircraft, and trains; building materials; vibration-proof rubbers for industrial machinery, equipments; various types of hoses and hose covers such as diaphragm, rolls, radiator hoses, and air hoses; belts such as power transmission belts; tire treads and sidewalls; lining; dust boots; a variety of medical equipment materials; materials for general processed products such as daily necessities, household goods and sports goods; rubber materials requiring heat resistance, such as heat-resistant packing, heat-resistant gaskets, heat-resistant O-rings, heat-resistant sealing materials, heat-resistant vibration-proof rubbers for engine mount and the like, heat-resistant hoses and hose covers, heat-resistant belts, heat-resistant lining, heat-resistant dust boots, medical equipment materials to be subjected to a heat treatment such as thermal disinfection.

EXAMPLES

The following will specifically describe the present invention based on Examples but the present invention is not limited to these Examples. Incidentally, "parts" and "%" in Examples and Comparative Examples are based on weight unless otherwise specified. Methods for measuring various physical properties of polymers are as follows.

Weight Average Molecular Weight Mw and Number Average Molecular Weight Mn

The weight average molecular weight Mw and number average molecular weight Mn (in terms of polystyrene) of a polymer other than polyethylene were determined by means of a gel permeation chromatograph (trade name "HLC-8320GPC EcoSEC," manufactured by Tosoh Corporation) under the following conditions.

Column: trade name "TSK gel Multipore HXL-M" (manufactured by Tosoh Corporation)
Column temperature: 40° C.
Mobile phase: tetrahydrofuran
Flow rate: 1.0 mL/minute
Sample concentration: 10 mg/20 mL Weight Average Molecular Weight Mw and Number Average Molecular Weight Mn of Polyethylene The weight average molecular weight Mw and number average molecular weight Mn (in terms of polystyrene) of polyethylene were determined by means of a high-temperature gel permeation chromatograph (trade name "PL-GPC 220," manufactured by Agilent Technologies Japan, Ltd.).

Column: trade name "PLgel Olexis" (manufactured by Agilent Technologies Japan, Ltd.)
Column temperature: 135° C.
Mobile phase: o-dichlorobenzene
Flow rate: 1.0 mL/minute
Sample concentration: 4 mg/4 mL Butadiene Content and Propylene Content [Mol %]

As described below, the butadiene structural unit content [mol %] and the propylene structural unit content [mol %] of the entire structural units of the polymer were determined by use of a $^1$H-NMR spectrum (400 MHz) as measured with deuterated chlorofortn serving as a solvent. Hereinafter, the cis-1,4-bond component of the butadiene structural unit is referred to as a "structural unit (Ubc14)"; the trans-1,4-bond component of the butadiene structural unit is referred to as a "structural unit (Ubt14)"; the 1,2-bond component of the butadiene structural unit is referred to as a "structural unit (Ub12)"; and the propylene structural unit is referred to as a "structural unit (Upp)."

<$^1$H-NMR>

Based on the integral values of the peaks of the following (a) to (c), the content ratio of the total of the structural unit (Ubc14) content and the structural unit (Ubt14) content, the structural unit (Ub12) content, and the structural unit (Upp) content in the copolymer (i.e., (Ubc14+Ubt14):Ub12:Upp [molar ratio]) were calculated by use of the following expression (1). The content ratio (mol %) of each structural unit of in the copolymer was determined on the basis of the above-calculated ratio.

(a) Total of the structural unit (Ubc14) content and the structural unit (Ubt14) content: δ5.36
(b) The structural unit (Ub12) content: δ4.95
(c) The structural unit (Upp) content: δ0.84

[E1]

$$(Ubc14 + Ubt14) : Ub12 : Upp = \frac{6A^1 - 3A^2}{6A^1 + 3A^2 + 4A^3} : \frac{6A^2}{6A^1 + 3A^2 + 4A^3} : \frac{4A^3}{6A^1 + 3A^2 + 4A^3} \quad (1)$$

(wherein $A^1$ represents an integral value of the peak at δ5.36, $A^2$ represents an integral value of the peak at δ4.95, and $A^3$ represents an integral value of the peak at δ0.84.)

Analysis of 1,4-Bond Component of Butadiene Structural Unit

The 1,4-bond component was analyzed on the basis of characteristic absorption bands (cis-1,4-bond: 740 cm$^{-1}$, trans-1,4-bond: 967 cm$^{-1}$) by means of FT-IR (trade name "Frontier") according to the ATR (attenuated total reflection) method.

Glass Transition Temperature Tg [° C.], Melting Point Tm [° C.], and Melting Enthalpy ΔH [J/g]

These values were determined from a melting curve prepared through measurement by means of DSC (trade name "DSC Q20," manufactured by TA Instruments Japan Inc.). A sample for measurement was prepared by enclosing a polymer (5 mg) into an aluminum-made sample pan (model numbers "900786.901" and "900779.901," manufactured by TA Instruments Japan Inc.). The measurement was performed by a method involving maintenance of the sample at 200° C. for one minute, subsequent cooling of the sample to −150° C. at a rate of 10° C./minute, subsequent maintenance of the sample at −150° C. for one minute, and subsequent heating of the sample to 200° C. at a rate of 20° C./minute. The total amount of heat absorption caused by crystal melting in the step of heating from −150° C. to 200° C. was defined as "melting enthalpy ΔH," and the temperature at which the amount of heat absorption peaks was defined as "melting point Tm."

Preparation of Vanadium Catalyst Solution

Preparation Example 1

Dehydrated toluene (700 mL), a compound represented by the following formula (1-A) (i.e., a ketimine derivative) (7.5 g), and vanadium oxytriisopropoxide (i.e., a transition metal compound) (5.2 g) were added to a glass-made container (inner volume: 1 L) purged with nitrogen, and the resultant mixture was refluxed for 20 hours. Subsequently, the resultant reaction mixture was cooled to room temperature, and then the solvent was removed through evaporation under vacuum, to thereby yield a black solid. The black solid was subjected to extraction with dehydrated acetonitrile at 70° C., and the resultant extract was air-cooled in a nitrogen atmosphere, to thereby precipitate a black crystal. Thereafter, the supernatant was removed, and acetonitrile was removed through evaporation under vacuum, to thereby yield a black crystalline vanadium compound (6.0 g). The vanadium compound (1.1 g) and tetrahydrofuran (THF) (0.38 g) were dissolved in dehydrated toluene (53 mL), and the resultant solution was used as a vanadium catalyst solution for polymerization.

[F2]

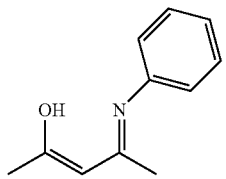

(1-A)

Synthesis of Polymer

Example 1

Toluene (29 mL) was added to a 500-mL glass-made polymerization tube purged with nitrogen at room temperature, and the polymerization tube was placed into a low-temperature bath at −55° C. Subsequently, propylene (0.9 g) and butadiene (5.8 g) (i.e., monomers) were added to the polymerization tube. A solution (1.8 mL) of methylaluminoxane (i.e., an organoaluminum compound) in toluene (10 mass %, manufactured by Albemarle) and a solution (0.3 mL) of 2-chloro-2-methylpropane (i.e., a halogen compound) in toluene (1.0 mol/L, manufactured by Wako Pure Chemical Industries, Ltd.) were then added to the polymerization tube, and the polymerization tube was heated to 0° C. Subsequently, the vanadium catalyst solution prepared in Example 1 (0.5 mL) was added to the polymerization tube, to thereby allow polymerization reaction to proceed for three hours. After the polymerization, methanol (2.0 mL) was added for termination of the reaction, and then coagulation reaction was performed with a large amount of methanol, followed by vacuum drying at 60° C., to thereby produce a polymer (hereinafter referred to as "copolymer A"). The amount of the produced copolymer A was 0.5 g.

Examples 2 to 5

The polymerization was performed in the same manner as in Example 1, except that the amounts of propylene and butadiene used were varied as shown in Table 1, to thereby produce copolymers B to E. Table 1 shows the amounts of the produced copolymers and the yields thereof.

TABLE 1

| | | Monomer | | | |
| | (Co)polymer | Propylene [g] | Butadiene [g] | Amount [g] | Yield [%] |
| --- | --- | --- | --- | --- | --- |
| Example 1 | A | 0.9 | 5.8 | 0.5 | 7.5 |
| Example 2 | B | 1.8 | 4.7 | 0.3 | 5.0 |
| Example 3 | C | 2.7 | 3.5 | 0.6 | 9.7 |
| Example 4 | D | 3.6 | 2.3 | 0.5 | 7.7 |
| Example 5 | E | 4.5 | 1.2 | 0.2 | 4.3 |

Referential Example 1

Toluene (6.9 mL) was added to a 500-mL glass-made polymerization tube purged with nitrogen at room temperature, and the polymerization tube was placed into a low-temperature bath at 0° C. Subsequently, the polymerization tube was purged with ethylene gas. A solution (5.8 mL) of methylaluminoxane (i.e., an organoaluminum compound) in toluene (10 mass %, manufactured by Albemarle), a solution (0.8 mL) of 2-chloro-2-methylpropane (i.e., a halogen compound) in toluene (1.0 mol/L, manufactured by Wako Pure Chemical Industries, Ltd.), and the vanadium catalyst solution prepared in Example 1 (1.6 mL) were then added to the polymerization tube, to thereby allow polymerization reaction to proceed for three hours. After the polymerization, methanol (2.0 mL) was added for termination of the reaction, and then coagulation reaction was performed with a large amount of methanol, followed by vacuum drying at 60° C., to thereby produce a polymer (hereinafter referred to as "polymer Q"). The amount of the produced polymer Q was 0.8 g (yield: 50.7%).

Referential Example 2

Toluene (29 mL) was added to a 500-mL glass-made polymerization tube purged with nitrogen at room temperature, and the polymerization tube was placed into a low-temperature bath at 0° C. Subsequently, butadiene (3.5 g) was added to the polymerization tube, and a solution (1.8 mL) of methylaluminoxane (i.e., an organoaluminum compound) in toluene (10 mass %, manufactured by Albemarle), a solution (0.3 mL) of 2-chloro-2-methylpropane (i.e., a halogen compound) in toluene (1.0 mol/L, manufactured by Wako Pure Chemical Industries, Ltd.), and the vanadium catalyst solution prepared in Example 1 (0.5 mL) were then added to the polymerization tube, to thereby allow polymerization reaction to proceed for three hours. After the polymerization, methanol (2.0 mL) was added for termination of the reaction, and then coagulation reaction was performed with a large amount of methanol, followed by vacuum drying at 60° C., to thereby produce a polymer (hereinafter referred to as "polymer R"). The amount of the produced polymer R was 0.2 g (yield: 5.2%).

Table 2 shows the properties of the produced (co)polymers A to E, Q, and R. In Table 2, "Mp" represents a peak top molecular weight. FIG. 1 illustrates the DSC curves of the (co)polymers A to E and R produced in Examples 1 to 5 and Referential Example 2. The 1,4-bond component of a butadiene structural unit of each polymer was analyzed by the ATR method. As a result, the absorption attributed to a cis-1,4-bond was not observed in both the butadiene homopolymer (polymer R) and the butadiene-propylene copolymers (polymers A to E). The results demonstrate that the 1,4-bond component of the butadiene structural unit has a trans-1,4-bond.

TABLE 2

| | (Co)polymer | Monomer | BD/PR | Molecular weight | | | | DSC | | | Micro structure Butadiene | | | Olefin [%] |
| | | | | Mn [*10⁴] | Mw [*10⁴] | Mw/Mn | Mp [*10⁴] | Tg [° C.] | Tm [° C.] | $\Delta$H [J/g] | cis-1,4-bond [%] | trans-1,4-bond [%] | 1,2-bond [%] | |
|---|---|---|---|---|---|---|---|---|---|---|---|---|---|---|
| Example 1 | A | Bd/Pr | 5/1 | 7.4 | 14.9 | 2.02 | 14.5 | −66.2 | −27.9 60.9 | 9.0 33.9 | 80.7 | | 0.8 | 18.5 |
| Example 2 | B | Bd/Pr | 2/1 | 7.4 | 14.0 | 1.90 | 12.9 | −63.5 | 35.2 | 27.0 | 73.8 | | 0.8 | 25.4 |
| Example 3 | C | Bd/Pr | 1/1 | 7.7 | 13.8 | 1.81 | 12.9 | −70.0 | 2.8 | 18.6 | 65.8 | | 0.6 | 33.6 |
| Example 4 | D | Bd/Pr | 1/2 | 6.7 | 12.1 | 1.82 | 11.6 | −69.6 | −10.2 | 3.8 | 60.0 | | 0.4 | 39.6 |
| Example 5 | E | Bd/Pr | 1/5 | 4.2 | 8.2 | 1.94 | 7.8 | −67.3 | — | — | 53.5 | | 0.2 | 46.3 |
| Referential Example 1 | Q | Et | — | 102.9 | 146.9 | 1.43 | 112.5 | — | 123.2 | 49.8 | | — | | 100 |
| Referential Example 2 | R | Bd | — | 5.4 | 13.6 | 2.52 | 10.5 | — | 72.2 130.4 | 91.3 46.6 | 96.1 | | 3.6 | — |

As shown in the above-described results, the polymerization catalyst containing a metal complex obtained by mixing a mixture of a ketimine derivative with a transitional metal compound, an organoaluminum compound, and a halogen compound achieved production of a conjugated diene compound-α-olefin copolymer of high molecular weight under mild temperature conditions. The melting point of the produced copolymer was varied through a change in the compositional ratio of the monomers (i.e., a change in the ratio of the structural unit derived from the conjugated diene compound in the produced copolymer). The results demonstrated that the polymerization of a conjugated diene compound and an α-olefin in the presence of the aforementioned polymerization catalyst produces a conjugated diene compound-α-olefin copolymer exhibiting a desired melting point. It is presumed that the production of such a copolymer is attributed to the control of linkage of trans-1,4-bonds of structural units derived from a conjugated diene compound in the copolymer.

The invention claimed is:

1. A polymerization catalyst, comprising
a metal complex obtained by mixing at least one ketimine derivative selected from the group consisting of a β-ketimine compound and a tautomer thereof with a compound having at least one transition metal selected from Group 4 and 5 transitional metals;
an organoaluminum compound; and
a halogen compound,
wherein the β-ketimine compound, if present, is a compound represented by formula (1):

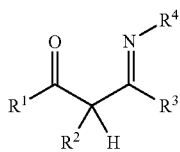

(1)

wherein R¹ to R⁴ each represent a hydrocarbyl group which is optionally substituted by a halogen atom.

2. A method for producing a copolymer, the method comprising:
conducting polymerization reaction between a conjugated diene compound and a C3 to C8 α-olefin in the presence of a polymerization catalyst wherein the polymerization catalyst comprises:
a metal complex obtained by mixing at least one ketimine derivative selected from the group consisting of a β-ketimine compound and a tautomer thereof with a compound having at least one transition metal selected from Group 4 and 5 transitional metals;
an organoaluminum compound; and
a halogen compound.

3. The method according to claim 2, wherein the polymerization reaction is performed at a temperature of from −50° C. to 50° C.

* * * * *